(12) United States Patent
Schmidt et al.

(10) Patent No.: US 10,309,449 B2
(45) Date of Patent: Jun. 4, 2019

(54) BALL JOINT ASSEMBLY AND METHOD OF MAKING

(71) Applicant: FEDERAL-MOGUL MOTORPARTS CORPORATION, Southfield, MI (US)

(72) Inventors: George R. Schmidt, St. Louise, MO (US); Tom Byrnes, St. Charles, MO (US); Glen Parker, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 229 days.

(21) Appl. No.: 15/331,254

(22) Filed: Oct. 21, 2016

(65) Prior Publication Data

US 2017/0102028 A1    Apr. 13, 2017

Related U.S. Application Data

(62) Division of application No. 12/124,215, filed on May 21, 2008, now Pat. No. 9,476,447.

(51) Int. Cl.
*F16C 11/06* (2006.01)
*B60G 7/00* (2006.01)

(52) U.S. Cl.
CPC .......... *F16C 11/0633* (2013.01); *B60G 7/005* (2013.01); *F16C 11/0685* (2013.01); *B23P 2700/11* (2013.01); *B60G 2204/416* (2013.01); *B60G 2204/42* (2013.01); *B60G 2204/4404* (2013.01); *B60G 2206/82* (2013.01); *Y10T 29/49664* (2015.01); *Y10T 403/32737* (2015.01)

(58) Field of Classification Search
CPC ... F16C 11/06; F16C 11/0614; F16C 11/0619; F16C 11/0623; F16C 11/628; F16C 11/0633; F16C 11/0657; F16C 11/0666; F16C 11/0671; F16C 11/068; F16C 11/0685; Y10T 29/49648; Y10T 29/49655; Y10T 29/49657; Y10T 29/49661; Y10T 29/49664; Y10T 403/32737; B23P 2700/11; B60G 7/005; B60G 2204/416
See application file for complete search history.

(56) References Cited

U.S. PATENT DOCUMENTS 5,601,378 A * 2/1997 Fukukawa .......... F16C 11/0638
                                            277/635
5,611,635 A * 3/1997 Schutt ................. F16C 11/0638
                                            403/122

(Continued)

*Primary Examiner* — Matthew P Travers
(74) *Attorney, Agent, or Firm* — Robert L. Stearns; Dickinson Wright, PLLC

(57) ABSTRACT

A ball joint assembly includes a ball stud, a cylindrical bearing, a housing and a retainer. The bearing has an upper end, a lower end, a exterior sidewall, an upper flange located between the upper end and a ring groove formed in the exterior sidewall, a lower flange proximate the lower end and extending outwardly and a socket cavity that opens toward the lower end. A ball portion of the ball stud is retained within the socket cavity. The bearing is secured within a bore within the housing by virtue of the working of the lower flange and the upper flange and retainer located in the ring groove. The ball joint assembly is able to resist a pull-out force of up to 1200 lbs. It may also be sealed by incorporation of a dust boot which extends between the housing and a stud portion of the ball stud.

8 Claims, 11 Drawing Sheets

(56) References Cited

U.S. PATENT DOCUMENTS

| | | | | |
|---|---|---|---|---|
| 5,676,485 A | * | 10/1997 | Lee | F16C 11/0642 277/635 |
| 6,533,490 B2 | * | 3/2003 | Kincaid | B60G 7/005 403/133 |
| 2004/0265046 A1 | * | 12/2004 | Hoppner | F16C 11/0633 403/122 |

* cited by examiner

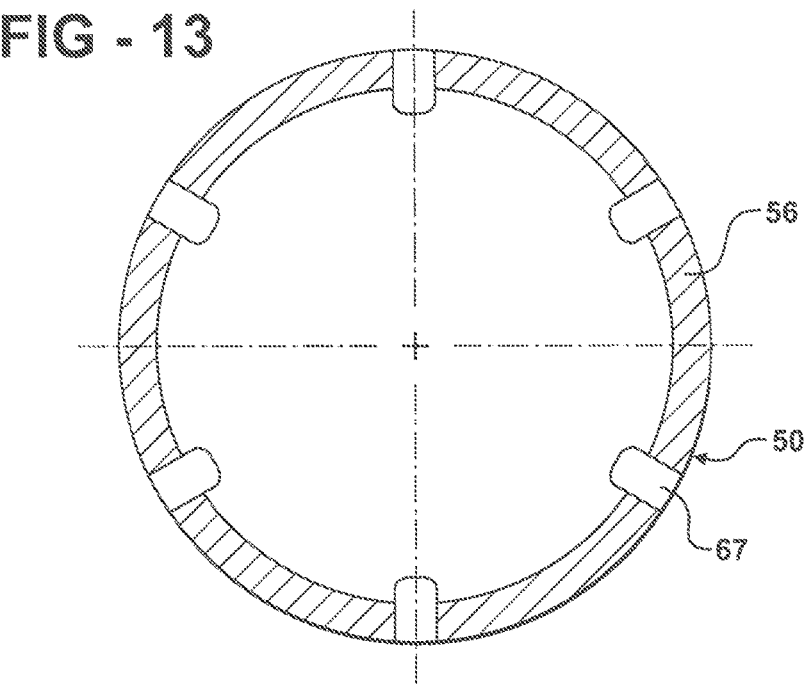
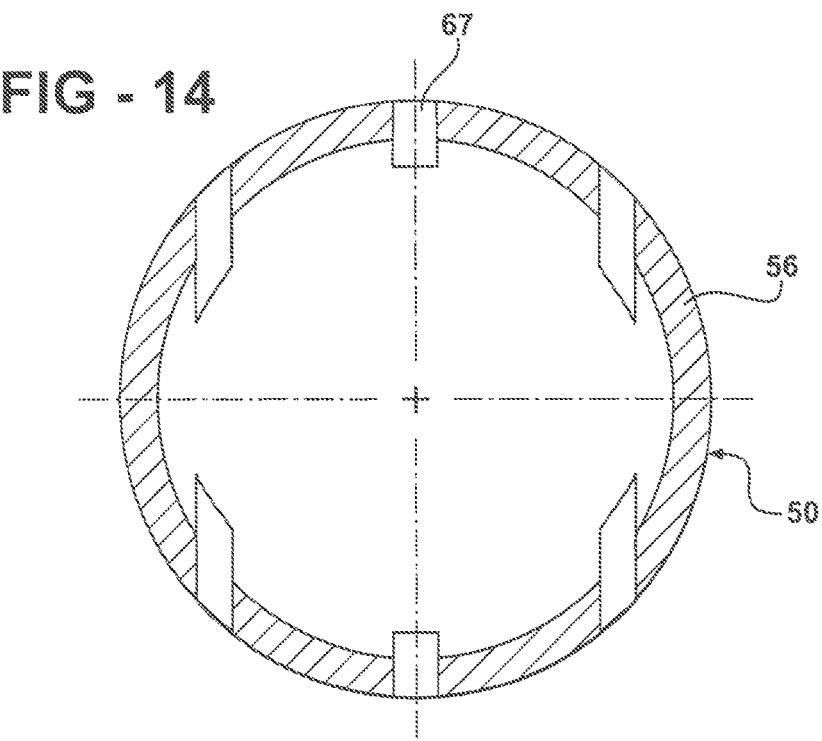

BALL JOINT ASSEMBLY AND METHOD OF MAKING

CROSS REFERENCE TO RELATED APPLICATION

This divisional patent application claims priority to U.S. Utility patent application Ser. No. 12/124,215, filed May 21, 2008, and is incorporated herein by reference.

BACKGROUND OF THE INVENTION

Field of the Invention

This invention relates to a ball and socket type joint of the type used in vehicular steering and/or suspension applications and, more particularly, toward a ball joint assembly having an plastic bearing insert and snap ring retainer.

Related Art

Ball joints are typically used in vehicular applications where three dimensional movement of a wheel or other component is required. The ball joint provides an articulated connection needed when a vehicle is turning and the suspension is accommodating movement over rough terrain or subjected to cornering forces. In the normal course of operation, ball joints are subjected to very high stresses. Thus, their components must be manufactured from strong, usually heavy, materials, such as steel. However, the recent emphasis on reducing vehicular weight is driving design criteria toward ball joints with reduced weight through the incorporation of materials such as various engineering plastics.

Furthermore, there is a also a need to reduce both the cost and complexity of components used in motor vehicles. The ball joints are no exception. By manufacturing the ball joint assembly from fewer components, assembly operations are more efficient, thus translating into lower costs particularly where the components can be manufactured to a near-net shape using processes such as molding, rather than the use of extensive machining and grinding operations to form the net-shape components. Additionally, fewer components usually enable weight reduction. Therefore, multiple interests are served by reducing the number of components used in a ball joint assembly, as well as by the use of materials and methods of manufacture which achieve the objective described above.

FIGS. 15-16 depict typical prior art ball joint assemblies 210 as used in the application of stabilizer linkages 200. Heretofore, ball joint assemblies 210 have generally been made by first forming a sturdy, metallic housing 215 and inserting therein one or two bearings 220, 222 which form a sliding interface between the articulating ball end 225 of a stud 230 and the housing 215. A metal cover plate 235 and o-ring 245 are mechanically seated over the housing to retain the bearing components and the ball portion of the stud 230 inside the housing 215 and an elastomeric boot 240 is used to seal ball joint assembly 210 from the external environment, including dirt, salt and other known contaminants. Depending upon the number of bearing components, possible spring take-up members, and dust boot features, this assembly may require five or six separate components not including the ball stud. See for example the exploded view of FIG. 16 where a typical prior art ball joint assembly is shown requiring six separate components, not including the ball stud 230, as well as two clamps (not shown) used to secure the dust boot 240 to the housing 215 and stud 230.

In addition to the complexity noted with prior art ball joints and their manufacture, prior art ball joints also typically have a limited ability to resist pull-out forces, or forces which tend to cause the ball stud to pull out of the bearing socket. Generally, prior art ball joints of the sizes and types used for automotive vehicles are able to resist pull-out forces in the range of 350-650 lbs.

Thus, there is a continuing desire to further reduce the number of components and the complexity and cost of ball joint assemblies as used in vehicular applications for the purposes mentioned, as well as to improve the ability of these joints to resist pull-out forces.

SUMMARY OF THE INVENTION

The invention includes an improved ball joint assembly having a reduced number of components six not including the ball stud, and assembly steps, particularly by virtue of its incorporation of an integral bearing cover, and an improved ability to resist pull-out forces as compared to prior art ball joints.

In one aspect, the invention includes a ball joint assembly with a ball stud having an attachment stud at one end and a ball portion at an opposing end; a generally cylindrical bearing having an upper end, a lower end, a generally cylindrical exterior sidewall, an upper flange located between the upper end and a ring groove formed in the exterior sidewall, a lower flange proximate the lower end and extending outwardly from the exterior sidewall and a socket cavity that opens toward the lower end, the ball portion engaged in and retained within the socket cavity; a housing having an upper end, a lower end and a generally cylindrical bore extending therebetween and defining a sidewall of the housing and a counterbore proximate the lower end forming a bearing shoulder within the sidewall, the bearing housed in the bore with the lower flange located within the counterbore and engaged with the bearing shoulder; and a retainer located in the ring groove.

In another aspect, the ball portion is frustospherical.

In yet another aspect, the socket cavity is frustospherical.

In yet another aspect, the socket cavity has a circumferentially tapered lead-in and the tapered lead-in tapers so as to converge into the socket cavity. The tapered lead-in may have any suitable angle, but will generally range between about 30 and 45°.

In yet another aspect, the bearing incorporates a lead-in taper extending from the top end to the exterior surface.

In yet another aspect, the bearing is a one-piece bearing.

In yet another aspect, the bearing includes an engineering plastic.

In yet another aspect, the bearing includes a plurality of slots which extend from the exterior surface to the socket cavity. The slots may be longitudinally extending, radially spaced slots with reference to a longitudinal axis of said bearing, or longitudinally extending, laterally spaced slots with reference to a longitudinal axis of said bearing.

In yet another aspect, the ball joint assembly also includes an integral bearing cover at the top end which encloses the socket cavity. The bearing cover may have a relieved portion which is recessed relative to the top end. The relieved portion may also include a plurality of ribs or struts which extend from the top end into the relieved portion.

In yet another aspect, the tapered lead-in defines a cavity opening into the socket cavity which is smaller than a maximum diameter of the socket cavity and operative, by virtue of the socket opening, to capture and retain the ball stud within the bearing and the housing and to resist a pull-out force of at least 650 lbs. applied to the stud relative to the bearing and the housing. The cavity opening may be arranged to provide an overlap amount in the range of about 0.070-0.140 inches between the maximum diameter of the socket cavity and a maximum diameter of the cavity opening and be operative, by virtue of the size of socket opening, to resist a pull-out force of at least 1000 lbs. applied to the stud relative to the bearing and the housing, and may further be in the range of between about 1000-1200 lbs.

In yet another aspect, the ball joint assembly may also include a generally cylindrical elastomeric boot having a housing end and a stud end, the housing end enclosing the housing and the stud end partially enclosing the attachment stud.

In yet another aspect, the invention includes a method of making a ball joint assembly, using the steps of: forming a ball stud having an attachment stud at one end and a ball portion at an opposing end; forming a housing having an upper end, a lower end and a generally cylindrical bore extending therebetween and defining a sidewall of the housing and a counterbore proximate the lower end forming a bearing shoulder within the sidewall; forming a generally cylindrical bearing having an upper end, a lower end, a generally cylindrical exterior sidewalk an upper flange located between the upper end and a ring groove formed in the exterior sidewall, a lower flange proximate the lower end and extending outwardly from the exterior sidewall and a socket cavity that opens toward the lower end; inserting the ball portion of the ball stud into socket cavity of the bearing; inserting the upper end of the bearing into the bore at the lower end of the housing so as to seat the lower flange of the bearing against the bearing surface of the counterbore and expose the top end of the bearing and the ring groove; and installing the retainer over the top flange sufficiently to achieve locking engagement with the ring groove. The method may also include a step of attaching a generally cylindrical elastomeric boot having a housing end and a stud end to said ball joint assembly, the housing end partially enclosing the housing and the stud end partially enclosing the attachment stud.

In yet another aspect the step of forming the bearing includes forming a relieved portion in a top end thereof. The step of forming the bearing with a relieved portion may also comprise forming at least one of a strut or a rib in the relieved portion.

In yet another aspect, the step of forming the bearing includes forming a socket cavity opening to the bottom end of the bearing with a tapered lead-in to the socket cavity defining a cavity opening, wherein a size of the cavity opening is selected to resist a pull-out load of at least 650 lbs.

In yet another aspect, the step of forming the bearing may also comprise forming at least one longitudinally extending slot in a sidewall of the bearing. This may include forming a plurality of longitudinally extending, radially spaced slots in the sidewall of the bearing, as well as a forming a plurality of longitudinally extending, laterally spaced slots in the sidewall of the bearing.

BRIEF DESCRIPTION OF THE DRAWINGS

These and other features and advantages of the present invention will become more readily appreciated when considered in connection with the following detailed description and appended drawings, like elements have been given the same numbers in the several views, and wherein:

FIG. 13 is a cross-sectional view of the bearing of FIG. 5 taken along section 13-13;

FIG. 14 is a cross-sectional view of the bearing of FIG. 12 taken along section 14-14;

DETAILED DESCRIPTION OF THE PREFERRED EMBODIMENT

Figure 1:
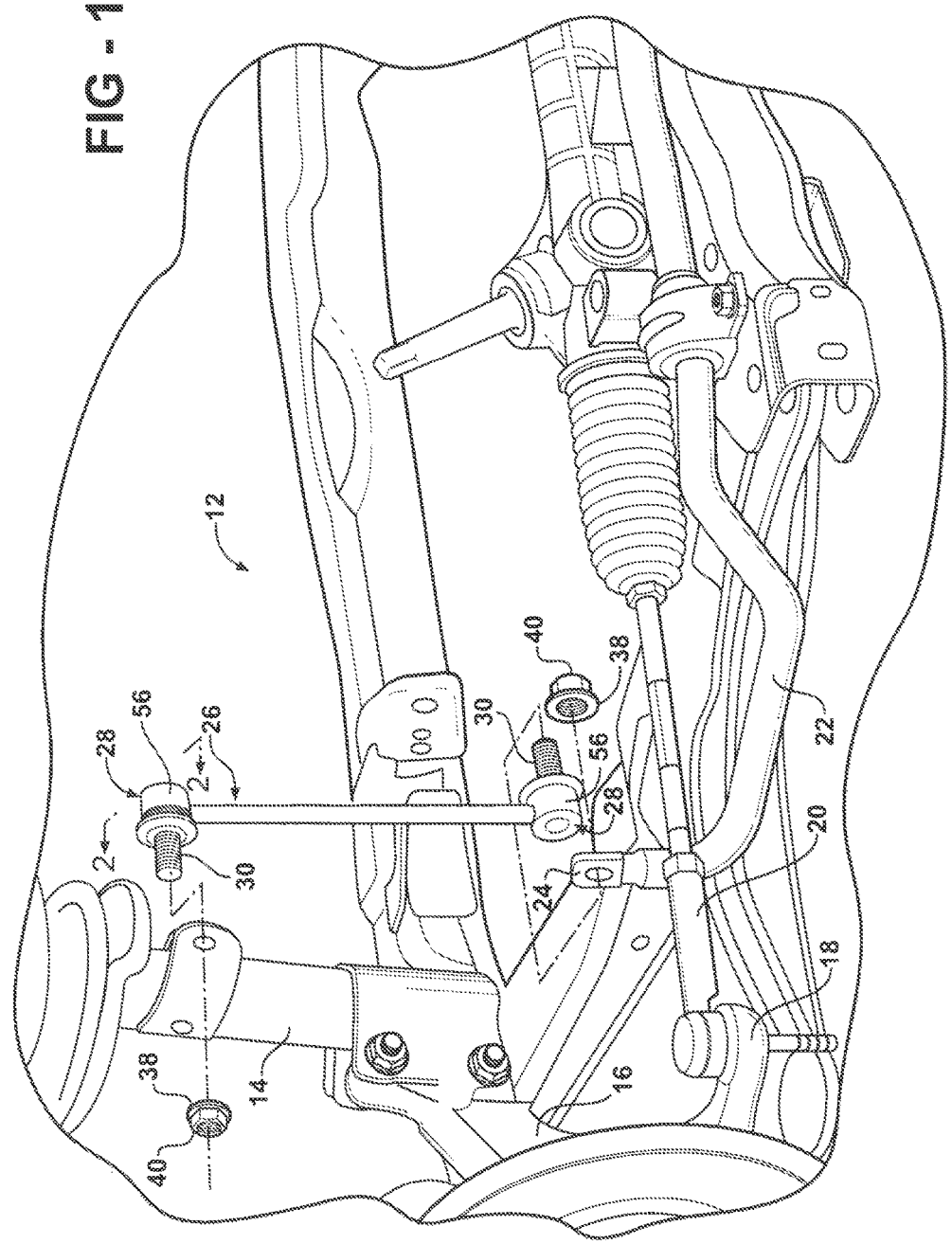
FIG. 1 is a perspective view of an exemplary application for the subject ball and socket joint assembly.

Referring to FIGS. 1-14 a vehicular steering and suspension assembly and associated components such as typically used in the front wheels of a motor vehicle is generally shown at 12 in FIG. 1. Although the front suspension system 12 is shown here comprising a MacPherson strut 14 type suspension system, it will be appreciated by those of skill in the art that the contemplated ball joint assemblies of the invention may find application in different control arm style suspension systems or in other forms and variations with equal effectiveness. For example, the invention may be deployed in steering or suspension linkages, frame member connections, and other articulating features, including all manner of stabilizer bars, tie rods and the like. Further, a ball joint assembly of the present invention may be utilized in all manner of non-vehicular applications which make use of an articulating joint.

Continuing with the illustrative application depicted in FIG. 1, the suspension system 12 is shown including a steering knuckle 16 and a spindle (not shown) upon which a vehicular wheel assembly (not shown) is mounted, together with appropriate braking and bearing components as are well known to those of skill in the art. A steering arm 18 extends transversely from steering knuckle 16 and is operatively connected to steering link 20. A stabilizer bar 22 is depicted including an outer attachment end 24. The stabilizer bar 22, which is sometimes referred to as an anti-roll bar, is adapted to receive and resist torsional stresses for the purpose of reducing body roll of the vehicle while influencing its cornering characteristics (i.e., over steer and under steer). A stabilizer link, generally indicated at 26, is connected at each end 24 of the stabilizer bar through a ball joint assembly, generally indicated at 28. The stabilizer link 26 connects the outer attachment end 24 of the stabilizer bar 22 and a bracket on the MacPherson strut 14. Of course, in non-MacPherson strut suspension applications, the stabilizer link 26 may be connected to a different feature, such as for example a lower control arm or other member as is well known to those of skill in the art. In non-suspension or non-vehicular applications, ball joint assembly may be operatively attached to all manner of other elements to promote pivotal or rotational movement therebetween, or a combination thereof.

Figure 2:
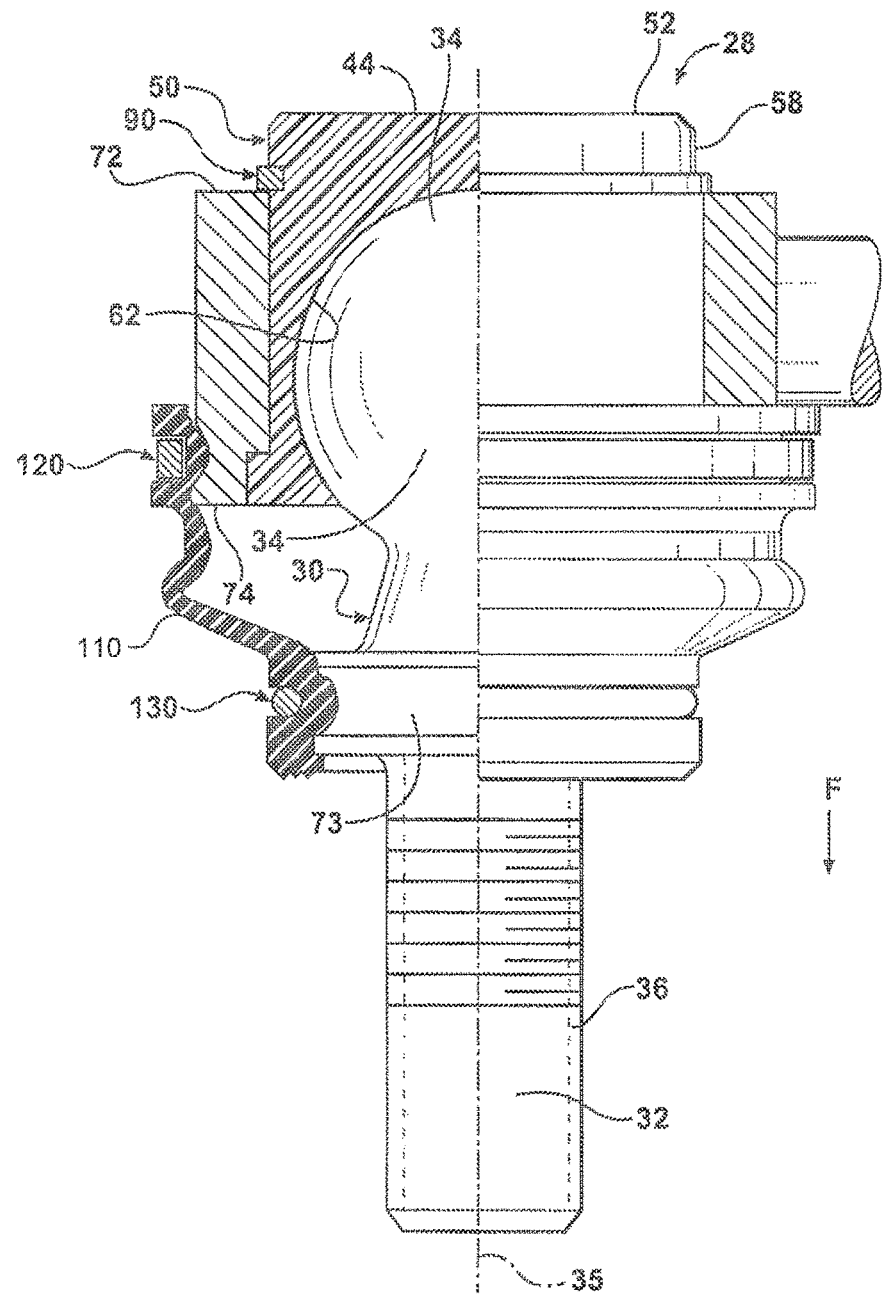
FIG. 2 is a partial cross-sectional view taken generally along lines 2-2 in FIG. 1.
Figure 3:
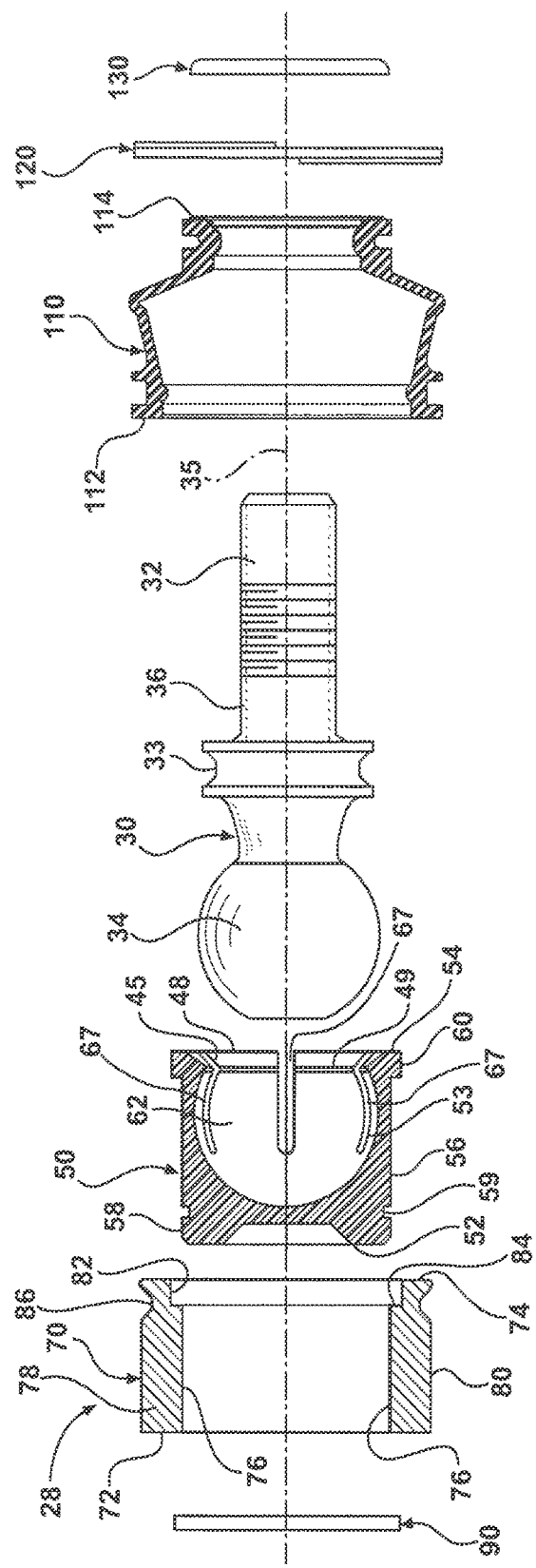
FIG. 3 is an exploded partial cross-sectional view of the subject ball and socket joint assembly of FIG. 2.

FIGS. 2 and 3 provide assembled and exploded cross-sectional views, respectively, of a ball joint assembly 28 of the invention as taken through the upper end of the stabilizer link 26; it being understood that the lower end of the stabilizer link 26 may be a mirror-image of its upper end. Ball joint assembly 28 includes a ball stud 30 having an attachment stud 32 at one end and a ball portion 34 at an opposing end. Ball stud 30 may also include a thread form 36 along attachment portion 32 which is used to attach ball joint assembly 28 to other components, including the components of a typical vehicle suspension system as described herein, using a washer 38 and threaded nut 40 (shown in FIG. 1). Threaded nut 40 may be advanced onto the thread form 36 for establishing the requisite forces and stresses through the ball stud 30 to maintain a secure connection to the strut bracket, or in other applications, other associated elements.

Ball joint assembly 28 also includes a generally cylindrical bearing 50 which has an upper end 52, a lower end 54 and a generally cylindrical exterior sidewall 56. Bearing 50 also has an upper flange 58 which is located between the upper end 52 and a ring groove 59 formed in the exterior sidewall 56, and a lower flange 60 which is located proximate the lower end 54 and extends outwardly from the exterior sidewall 56, as well as a socket cavity 62 that opens toward the lower end 54. As shown in FIG. 2, the ball portion 34 of ball stud 30 is engaged in and retained within and by the socket cavity 62 by means of a snap-fit connection whereby ball portion 34 is inserted into socket cavity 62 as described herein.

Ball joint assembly 28 also includes a housing 70 which has an upper end 72, a lower end 74 and generally cylindrical bore 76 extending therebetween and defining a sidewall 78 of the housing. Housing 70 also has an exterior surface 80, a counterbore 82 located proximate the lower end 74 and forming a bearing shoulder 84 within the sidewall 78. Further, a clamp groove 86 may be located on the exterior surface 80. The bearing 50 is housed in the bore 76 with the lower flange 60 located within the counterbore 82 and engaged in pressing contact with the bearing shoulder 84.

Ball joint assembly 28 also includes a retainer 90 located in the ring groove 59 which together with bearing shoulder 84 captures the bearing 50 within housing 70. Ball joint assembly 28 may also include a generally cylindrical elastomeric boot 110 which has a housing end 112 and a stud end 114. The housing end 112 partially encloses the lower end 74 of the housing, and the clamp groove 86 when it is used, and is fixed to the exterior surface 80 of the housing 70 by a suitable retainer 120. Retainer may be any suitable retainer 120, such as various housing clamping means 120, including a spring clamp 120. The stud end 114 partially encloses and is fixed to the attachment stud 32 by a suitable retainer 130, such as stud clamping means 130, including a ring clamp 130. The various elements of ball joint assembly 28 and their interrelationship, materials, manufacture and assembly are described further below.

Referring again to FIGS. 2 and 3, ball stud is shown generally at 30, having a ball portion 34 at one end thereof. The ball portion 34 may be partially spherical. The nature and extent of the spherical portion may vary from a substantially full spherical portion in which the spherical ball is interrupted only by the portion of the sphere surface and interior needed to attach the stud, as shown, to a fractional spherical portion (e.g., a hemispherical, frustospherical or other partial spherical portion) depending on the range and types of articulation needed for the ball joint application. Other non-spherical ball forms, such as ellipsoidal ball/socket forms are also possible in accordance with the invention. An attachment portion 32, in the form of a stud or shank, extends from the ball portion 34 and may include a thread form 36 or other means for attaching ball stud 30 to an anchoring control member which, in this case, is indicated as the bracket extending from the MacPherson strut 14 (see FIG. 1). Ball stud 30 may also include along the attachment portion 32 a collar groove 33 suitable for sealing engagement with dust boot 110. Collar groove 33 may have any suitable profile, including various arcuate and partially cylindrical profiles. Ball stud 30 may be made from any suitable material, including various metals and metal alloys, such as various steel alloys.

Figure 4:
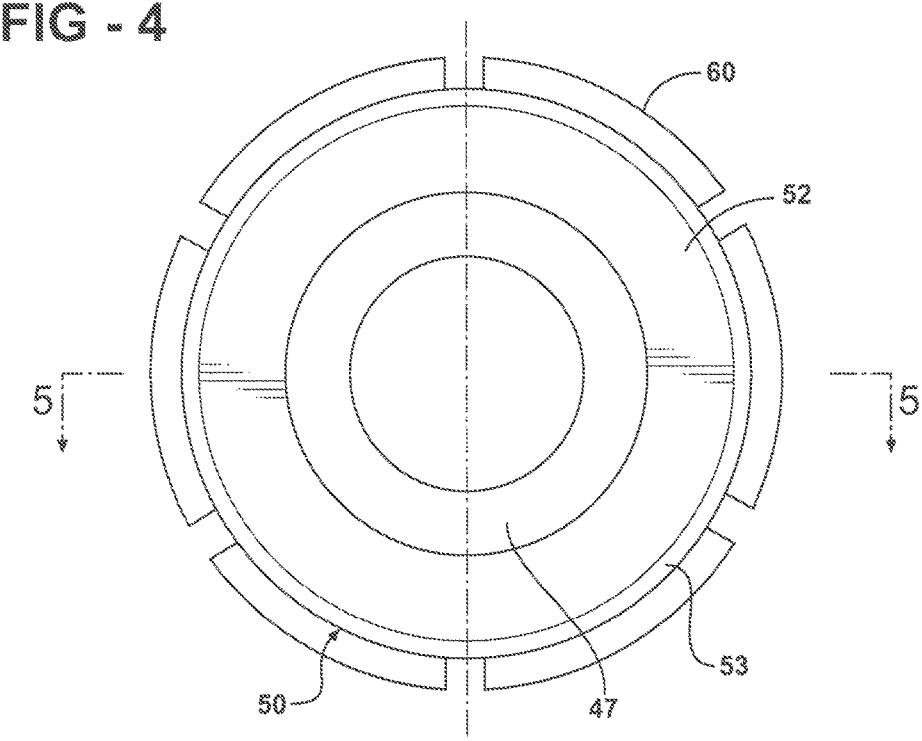
FIG. 4 is a top view of the bearing of FIG. 3.
Figure 5:
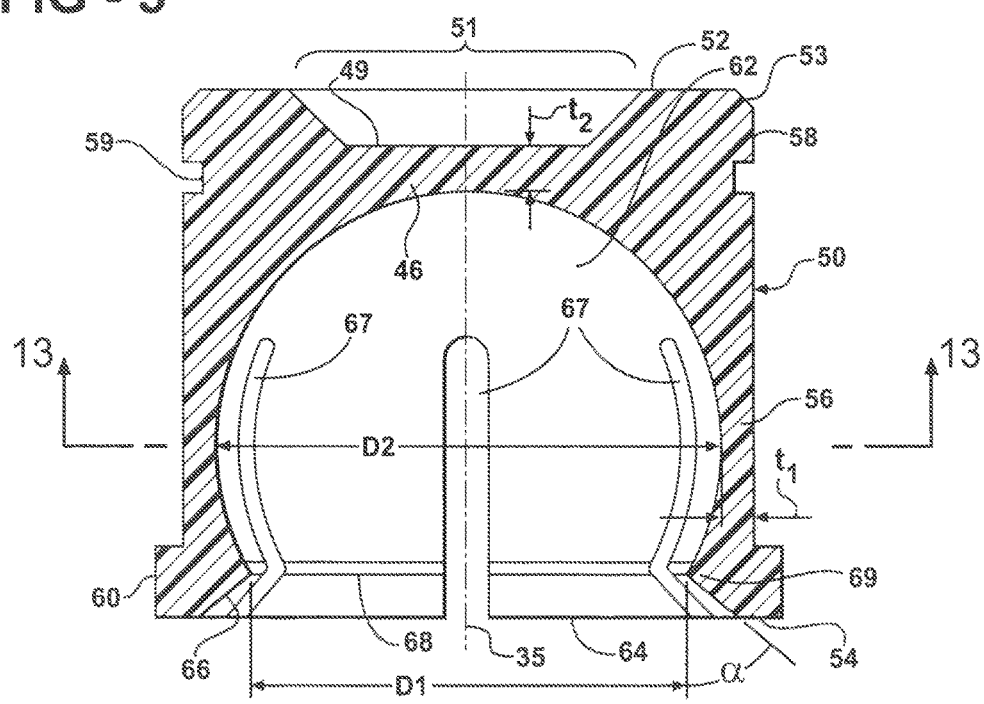
FIG. 5 is a cross-sectional view of the bearing of FIG. 4 taken along Section 5-5.

As perhaps best shown in FIGS. 2 and 3, a bearing or socket 50 engages and, in the embodiment illustrated, partially surrounds the ball portion 34 of the ball stud 30 for providing an articulating interface therewith which allows pivotal movement with regard to the longitudinal axes associated with each of them, as well as relative rotational movement around these axes. Bearing 50 may be made from any suitable bearing material, including various polymer materials, such as various engineering plastics, including engineering thermoplastics (e.g., polyacetal, polyoxymethylene), which may be adapted to receive sufficient elastic deformation for a snap fit so as to be received in a force-fitting assembly operation with the ball portion 34 (see e.g., FIGS. 10A-10B), as described below. Of course, other material compositions may be substituted, depending upon the particular application requirements and availability. Bearing 50 may be formed using any suitable forming method, including various plastic molding methods, such as various injection molding methods, to form a final or near-net shaped bearing 50. Bearing 50 is preferably a one-piece bearing, but may also be formed as more than one piece in accordance with the invention, such as a longitudinally divided two-piece or multi-piece bearings or the like. Referring also to FIGS. 4 and 5, bearing 50 has a partially-spherical internal socket cavity 62, which in the embodiment illustrated is a frustospherical socket cavity 62, which opens to a open lower end 54, such as by tapered lead-in 66, such as generally frustoconical tapered bore 66. The tapered lead-in converges inwardly toward the socket cavity 62 to cavity opening 68. The taper angle ($\alpha$) of tapered lead-in 66 together with the profile of the stud portion 32 where it joins to ball portion 34 determine the maximum angle through which ball stud 30 and joint 28 may be articulated with respect to bearing 50 and housing, 70. The taper angle will generally range from about 30 to 45°.

The socket cavity 62 is sized and shaped to contact and engage ball portion 34 while allowing it to swivel or pivot and rotate about the ball portion 34 in typical ball and socket fashion. Typically, the generally circular cavity opening ($d_2$) 68 to socket cavity 62 provides a restricted cavity opening 68 which requires elastic deformation of the bearing by expansion of the opening 68 sufficient to permit the ball portion 34 to be inserted through the opening and into socket cavity 62. The ball portion 34 and cavity opening, as well as other portions of bearing 50, may be sized relative to one another so as to permit elastic deformation of the cavity opening 68 and bearing 50 sufficient to allow insertion of the ball portion 34 into the socket cavity 62 and retention of the ball portion 34 in pressing, bearing engagement with bearing 50 once the ball portion 34 is inserted into the cavity and the elastic deformation which occurs during insertion is at least partially relieved. Once relieved, the restricted cavity opening 68 and the associated overlapping lower portion 69 of the bearing 50 act to retain the ball portion 34 in bearing 50. The amount of overlap directly effects the pull-out force (F) required to pull ball portion 34 out of bearing 50 once ball joint assembly 28 has been completely assembled. This aspect of bearing 50 generally determines the maximum pull-out force to which ball joint assembly 28 may be exposed without failure of the joint. In the case of ball joint assembly 28, with suitable selection of the size, amount of overlap, and materials used for ball stud 30, bearing 50 and housing 70, a pull out force of greater than 650 lbs. may be achieved. The amount of overlap represented by the difference between the maximum dimension, such as maximum diameter ($d_1$) of socket cavity 62 and the diameter of cavity opening 68 ($d_2$) will preferably be in the range of 0.070-0.140 inches, generally divided equally as 0.035-0.070 inches per side. By controlling overlap within this range using materials of the types described herein for the ball stud 30, bearing 50 and housing 70, ball joint assemblies with pull out forces of greater than 1000 lbs and up to about 1200 lbs. have been achieved for ball joint assemblies of the types and sizes typically employed in automotive applications, such as those having a diameters of ball portion 34 in the general range of about 0.5 to 1.5 inches, and more particularly 0.75-1.2 inches typical of many small to medium size joint configurations such as are used for many tie rod, steering linkage and suspension linkage applications, and more particularly 0.70-0.90 inches commonly used for many steering linkage and suspension linkage applications, including the stabilizer bars as described herein. Thus, in accordance with the invention, the manufacture of steering links having at least one ball joint assembly 28 with a pull-out force of greater than 650 lbs. and up to about 1200 are enabled.

The opposite or upper end 52 of bearing 50 is provided with an upper flange 58. Upper end 52 may be open and include an opening for a grease fitting analogous to that shown in FIGS. 15 and 16, or closed as shown in FIGS. 3-5. When upper end 52 is closed, it serves as a bearing cover, which in the embodiments shown is an integral bearing cover, as shown, for example, in FIGS. 4, 5, 11 and 12, which acts to enclose the upper end 52 of bearing 50, and particularly socket cavity 62, thereby preventing dirt, moisture, road debris or other contaminants from infiltrating the joint, particularly the bearing surface and interface between the surface of socket cavity 62 and the surface of ball portion 34. Exclusion or reduction of such contaminants by incorporation of closed upper end 52 as a bearing cover preserves the operational integrity and longevity of ball joint 28 by eliminating or significantly reducing infiltrating by water, dirt and other contaminants, and thereby associated corrosion and other joint wear mechanisms.

The upper end 52 of bearing 50 may also include a relieved portion 51 which is recessed with respect to the other portions of upper end 52. This feature has the effect of reducing the wall thickness at the upper end 52 as compared to the thickness of one which does not include this feature (not shown except in the areas of top end which do not include the relief), thereby reducing the amount of material needed to form bearing 50, and from another perspective, maintaining a wall thickness in the upper end 52 that is more uniform and consistent with that of the bearing sidewall 56 than would otherwise be the case. The amount of relief may be varied by adjusting the area of upper end 52 which is relieved and the depth of the relief, as well as the contour or profile of sidewall 47. The incorporation of relieved portion 51 reduces cost by reducing material usage and can be used to maintain an upper wall 46 thickness profile, including a minimum thickness ($t_2$) which is the same or substantially similar to the wall profile of bearing sidewall 56, including a minimum thickness ($t_1$). The addition of relieved portion 51 aids in molding bearing 50 by reducing the mold cycle time. Making these profiles similar also reduces or eliminates defects such as warping of bearing 50 that may occur during cooling of the part after molding.

Figure 11:
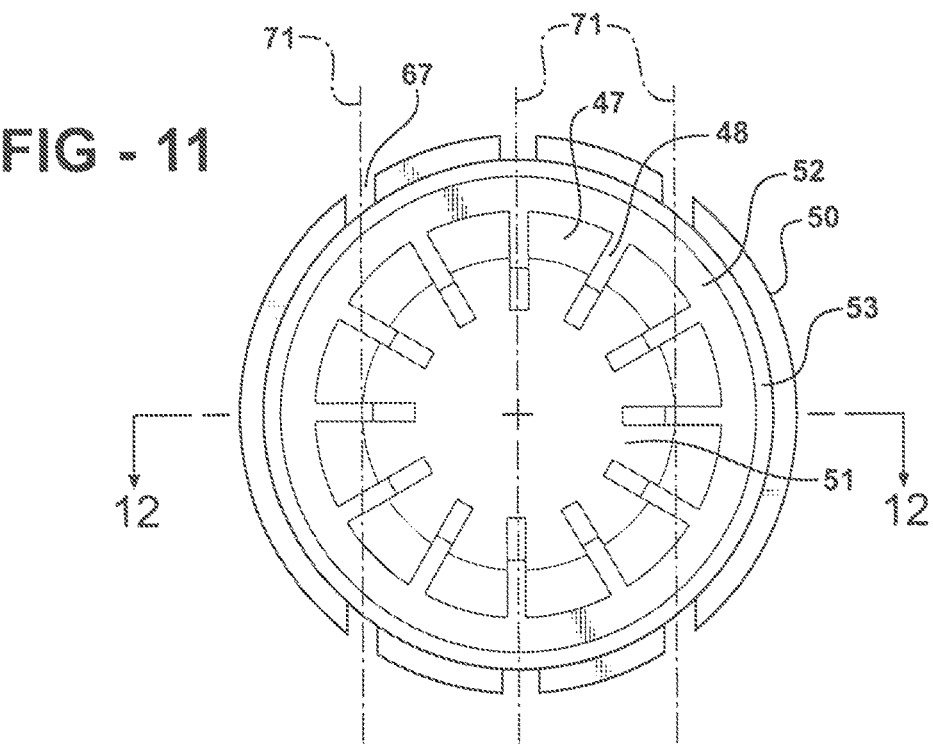
FIG. 11 is a top view of an alternate bearing configuration in accordance with the invention.
Figure 12:
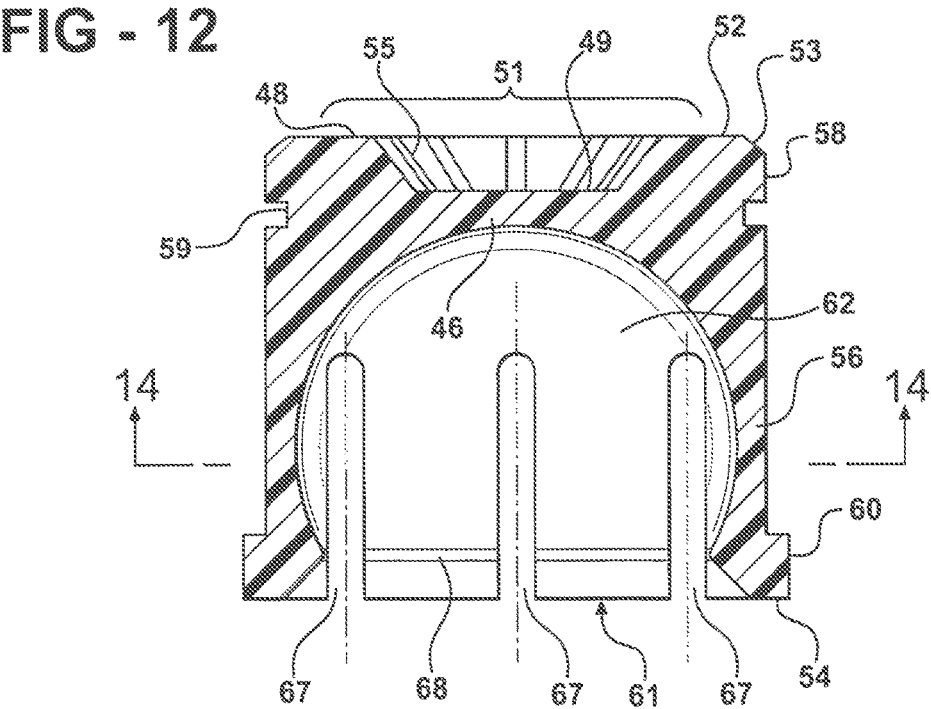
FIG. 12 is a cross-sectional view of the bearing of FIG. 11 taken along section 12-12.

Referring to FIGS. 11-12 which illustrate an alternative embodiment of bearing 50, bearing 50 may optionally incorporate one or more ribs or struts 48 located in relieved portion 51 to strengthen and stiffen the upper end 52 of bearing 50, particularly upper wall 46 with respect to forces distributed in upper wall 46 when pull-out or tensile forces (i.e., those forces which have a tendency to pull the ball stud 30 and/or bearing 50 out of the housing are applied to these components. Ribs or struts 48 may extend entirely across relieved portion 51 (i.e., as a rib) or from the side wall 47 to the base 49 of relieved portion (i.e., as a strut), or a combination of both. Without the ribs or struts 48, it is believed that tensile forces of a sufficient magnitude may cause cupping or other undesired flexure of upper wall 46 proximate relieved portion 51, which in turn can compromise the attachment of the upper flange 58 and retainer 90 to the housing 70, thereby effectively lowering the force (F) required to pull the upper flange out of the housing, as well as possibly diminishing the performance of the bearing by altering the stress distribution along the bearing surfaces. In an exemplary embodiment, bearing 50 included twelve struts 48 spaced substantially equally around the circumference of relieved portion 51 which protruded radially inwardly from its side wall 46 and upwardly from its base 49, and which each had an inner end face 55 which tapers inwardly and downwardly toward base 49.

Referring again to FIGS. 3, 4, 5, 11, 12, 13 and 14, bearing 50 also incorporates at least one and preferably a plurality of slots 67. Slots 67 enable molding by permitting bearing side wall 56 to flex sufficiently to facilitate removal of the portion of the mold used to form socket cavity 62. Slots 67 also enable flexure of exterior sidewall 56 sufficiently to enable insertion and snap-fit of the ball portion 34 into the socket cavity during assembly of the ball joint 28. Slot or slots 67 also serve as passages for lubricant, such as grease, which in service is forced into the slots 67 as ball joint 28 is articulated, thereby lubricating the surface of ball portion 34 so as to enhance or maintain the ability to articulate the joint, as well as reduce the wear of the bearing surface. Slots 67 may be longitudinally extending, radially spaced slots as shown in FIGS. 3-5. Alternately, slots 67 may be one or more longitudinally extending, laterally spaced slots 67, where slots 67 define a series of parallel planes 71, as shown in FIGS. 11, 12 and 14. This arrangement is particularly well adapted to formation using standard plastic injection molding methods, since the mold inserts used to form slots 67 may all be withdrawn in the same direction and at the same time, and thus may be formed as a unitary insert, as contrasted with the plurality of inserts needed to form the slot 67 configuration illustrated in FIGS. 4 and 5.

Retainer 90 may be in the form of a snap ring 90. The outer diameter of cylindrical side wall 56 and upper flange 58 and the inner diameter of snap ring 90 are sized to receive snap ring 90 in sliding engagement, with appropriate interference, over the exterior surface of upper flange 58, which may also include a lead-in taper 53 to facilitate sliding engagement of the snap ring 90 as it is pushed over upper end 52, up the lead-in taper 53 and over the exterior surface of flange 58 and into ring groove 59. Ring groove 59 is formed in side wall 56 continuously and annularly thereabout, adjacent upper flange 58. The outer diameter of upper flange 58, the depth and width of ring groove 59 and the inner diameter of snap ring 90 are sized so as to create an interference that permits insertion of snap ring 90 into ring groove 59 as described, as well as establishes minimum pull-out force necessary to extract the assembly of ball stud 30 and bearing 50 from housing 70 once snap ring 90 has been inserted into ring groove 59. In an exemplary embodiment, the minimum pull out force was greater than 650 lbs., and may be improved to greater than 1000 lbs, and even in certain combinations greater than about 1200 lbs. In an exemplary embodiment, the diameter of upper flange 58 and cylindrical side wall 56 are about 1.000 inches, while the diameter of lead-in taper 53 is about 0.940 inches, and the diameter at the root of the ring groove 59 is about 0.940 inches. The inner diameter of snap ring 90 is about 0.885 inches. Bearing 50 also has external lower flange 60 protruding from bearing side wall 56 proximate entrance opening 61 of socket cavity 62. In an exemplary embodiment, the diameter of lower flange 60 is about 1.097 inches. Bearing 50 and particularly cavity 62, act as a bearing and bearing surface, respectively, for ball portion 34, operatively enabling both rotation of ball stud 30 about longitudinal axis 35 as well as pivoting translation of the stud portion 32 within the limits of travel established by frustoconical taper 66 which limits the pivoting translation of ball stud 30 within bearing 50.

Figure 6:
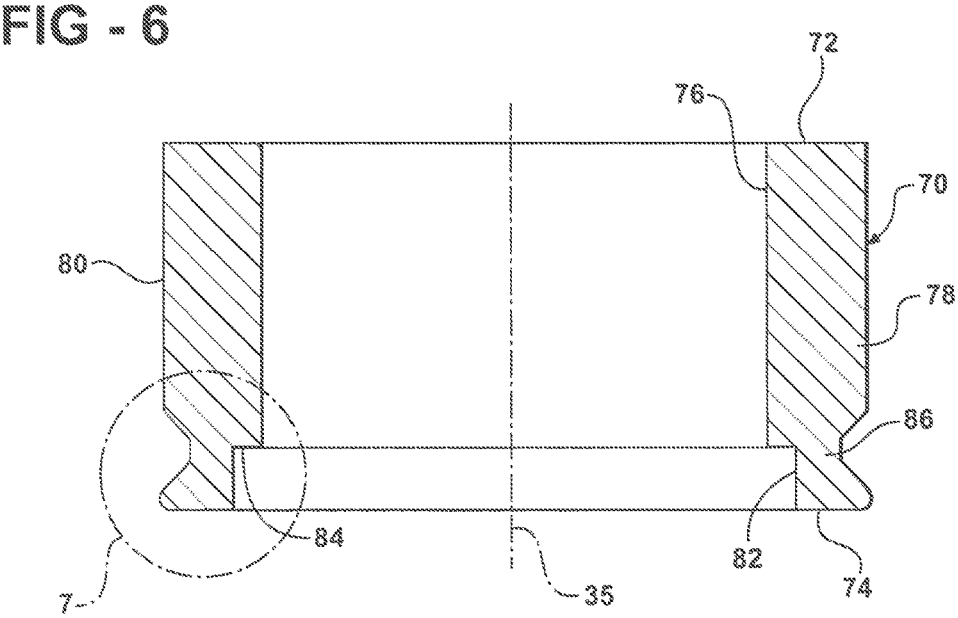
FIG. 6 is an enlarged cross-sectional view of the housing of FIG. 3.
Figure 7:
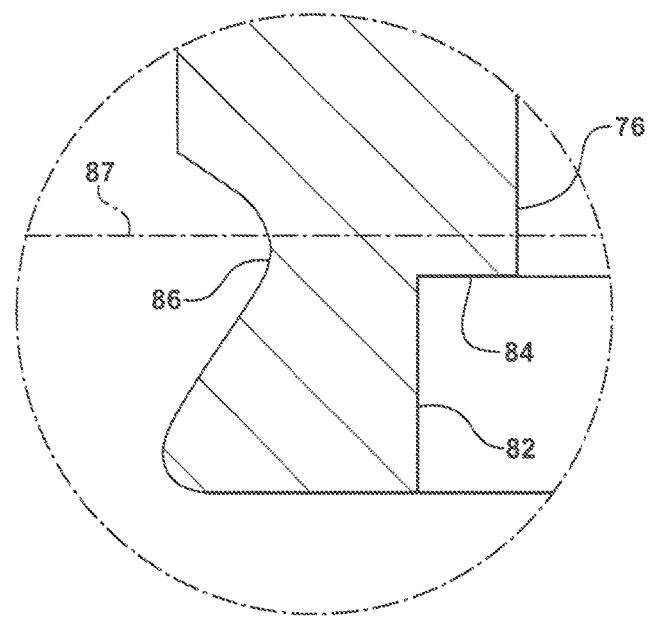
FIG. 7 is a further cross-sectional enlargement of region 7 of FIG. 6.
Figure 8:
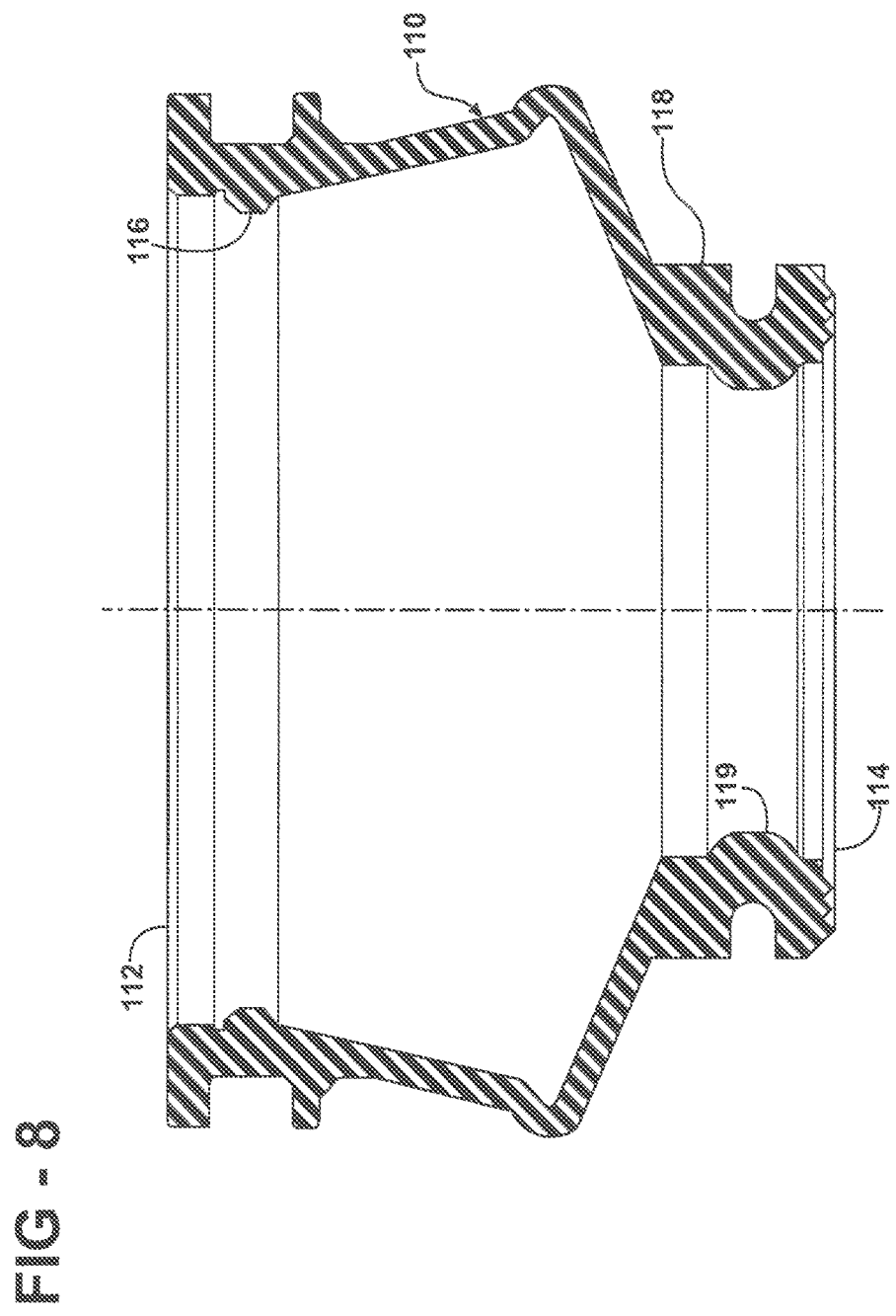
FIG. 8 is an enlarged cross-sectional view of the boot of FIG. 3.
Figure 9:
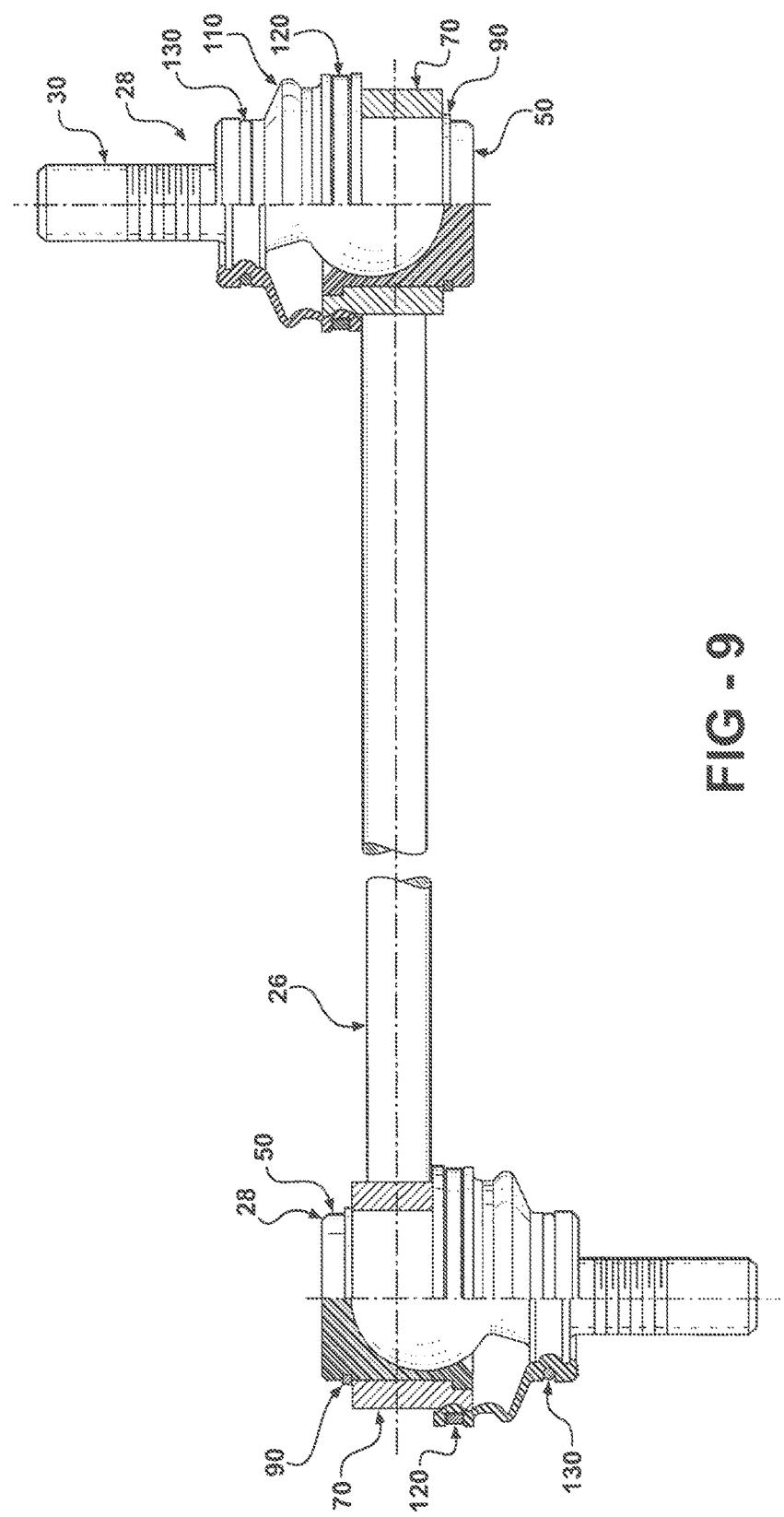
FIG. 9 is a partial cross-sectional view of a stabilizer linkage incorporating the ball joint assemblies of the present invention.
Figure 10:
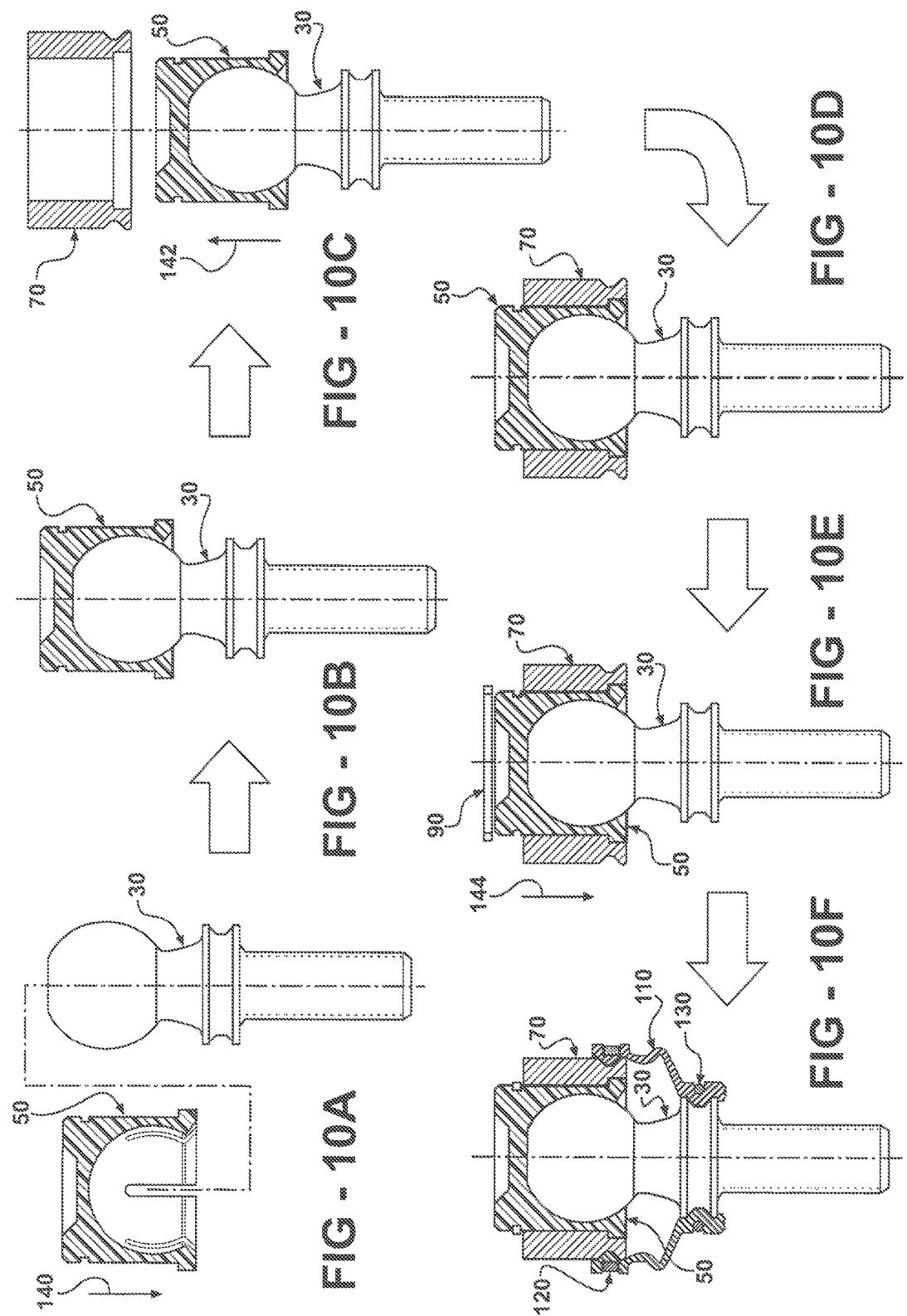
FIG. 10A-10F are schematic illustrations of the steps of a method of assembling a ball joint assembly of the present invention.

Referring also to FIGS. 3, 6 and 7, a rigid, cylindrical housing 70 forms a sleeve-like member disposed about the exterior side wall 56 of bearing 50. The housing 70 in this example is integrally formed at the ends of the elongated cross-bar of the stabilizer link 26. This aspect may of course change for other ball joint applications. The housing 70 is open at both ends by virtue of longitudinally extending bore and is provided with an internal relief in the form of counterbore 82 formed in bore 76 proximate lower end 74. In the fully installed, operational, and assembled condition of the ball joint assembly 28 as shown in FIG. 2, the counterbore 82 aligns with and is operative to receive upper surface of exterior lower flange 60 in bearing engagement on shoulder 84. In an exemplary embodiment, housing 70 has an outer diameter of about 1.375 inches, bore 76 has a diameter of about 1.000 inches and counterbore 82 has a diameter of about 1.110 inches. The wall thickness of housing 70 proximate counterbore 82 is operative to house the ball joint for the intended application and resist the pull-out of ball portion 34 of stud 30 when bearing 50 is retained in housing 70 by snap ring 90, so as to resist a pull-out force (F (see FIG. 2)) of at least 650 lbs. as described herein.

Housing 70 may also include a clamp groove 86 located on its outer surface 80. Clamp groove 86 may be located at any suitable location along the outer surface 80 of housing 70, but will preferably be located on outer surface 80 proximate lower end 74 which includes counterbore 82. In the embodiment illustrated in FIG. 6, clamp groove 86 is located the lower portion of counterbore 82 proximate the seating shoulder 84. Clamp groove 86 may have any suitable shape, including a rectangular or trapezoidal cross-sectional shape, as well as the generally arcuate shape shown in FIGS. 6 and 7. The generally arcuate shape shown in these figures is generally symmetric about a groove axis 87 (see FIG. 7), which in this embodiment is located slightly above seating shoulder 84. The generally arcuate shape is formed by two converging tapers having a radius of curvature at the point of convergence.

This generally arcuate shape is adapted to receive an attaching clamping means 120, such as spring clamp 120 or a hand clamp (not shown). Attaching clamping means 120 may be operative for permanent or removable attachment of boot 110 to housing 70. For example, in the case of a spring clamp 120, the clamp is expanded to a size such that the inner diameters of spring clamp 120 is greater than the outer diameter of housing 70 and boot 110, such that it may be expanded and slipped over the outer surface of housing 70 and boot 110 until it is located over clamping groove 86, wherein it is released allowing the attaching ring 60 to partially close to a diameter which is sufficient to apply a clamping force to the boot 110 and outer surface of housing 70 at the location of clamp groove 86. In addition to various spring clamps, attaching clamping means 120 may also include various permanent or removable band clamps or other types of clamps suitable for applying the clamping forces described above.

Attaching clamping means, such as spring clamp 120, simultaneously retains the accordion-like rubber dust boot 110 to the housing 70. Proximate the housing end 112 of dust boot 110, the inner surface of dust boot 110 may also include an upper protrusion 116 which is operative for engagement in clamp groove 86 together with spring clamp 120. The lower end 114 of the dust boot 110 includes a collar 118 which is operative to seat on the outer surface of the stud portion 32. Collar 118 may also include a collar protrusion 119 which is operative to sealingly engage a complementary collar groove 33 feature on the stud 30, such as shown in FIG. 2, generally by operation of a collar ring 130 which may include any form of a retaining ring clamp or the like suitable to retain collar 118 in a seated and sealing relationship to stud portion 30 during articulation or rotation of ball stud 30. Dust boot 110 may also include grooves to assist in locating the clamping members described herein, including upper groove 115 proximate upper protrusion 116 and lower groove 117 proximate collar 118, including collar protrusion 119. Thus, as the bearing 50 articulates or rotates relative to the ball stud 30, dust boot 110 maintains a secure connection at its upper end 112 and lower end 114 so as to prevent the infiltration of debris into the working interfaces between the bearing 50 and ball portion 34. Dust boot 110 may be made from any suitable elastomeric material, including various natural or synthetic rubber compositions, various silicones and the like.

FIGS. 10A-F depict, in highly illustrative fashion, the method of making ball joint assembly 28 after the manufacture of the respective components. FIGS. 10A and 10B illustrate the assembly of bearing 50 over the ball end portion 34 of ball stud 30 by pressing bearing 50 over ball end portion 34 in the direction shown by arrow 140 to elastically expand bearing 50 until ball portion 34 snaps into semi-spherical socket cavity 62. It will be understood that the motion of these components is relative, and it is a matter of design and assembly choice in the assembly process for these and the other components described herein as to which component is moved with respect to the other to accomplish a particular assembly or subassembly. Thus, bearing 50 retains ball end portion 34 of ball stud 30. The ball stud 30 and bearing 50 sub-assembly (see FIG. 10B) may then be utilized for further assembly of ball joint assembly 28.

As illustrated in FIG. 10C, the stud 30 and bearing 50 subassembly is inserted into the lower end 74 of housing 70 in the direction shown by arrow 142. It is preferred that the outer diameter of bearing 50 establishes an interference fit with the diameter of bore 76, thereby establishing a preloading of the ball portion 34 and the surface of the socket cavity 62. The amount of interference establishes the preload of the bearing with larger interferences creating a larger preloads which in to require larger forces to articulate or rotate ball stud 30 within bearing 50. The relative sizes and the amount of interference is a matter of design choice and will depend on the desired operating characteristic of ball joint assembly 28, materials selected for bearing 50 and ball portion 34 as well as the surface roughness of the bearing surfaces, lubrication and other factors. In an exemplary embodiment, bearing 50 had a nominal diameter of about 1.007 inches and bore had a nominal diameter of about 1.000 inches, for a diametral interference of about 0.007 inches. The bearing preload establishes the torque necessary to overcome the friction of the bearing surfaces and cause articulation of ball stud 30 within socket cavity 62, and generally is selected to require a torque in the range of about 5-50 inch-pounds and more preferably between about 20-35 inch pounds, to produce articulation of the joint. Bearing 50 is inserted into bore 76 as described until the upper surface of lower flange 60 seats against bearing shoulder 84 in counterbore 82, as shown in FIG. 10D.

Once the subassembly of ball stud 30 and bearing 50 has been seated in housing 70, retainer 90 is installed into ring groove 59, thereby capturing and fixing bearing 50 within housing 70. This may be performed by using a retainer 90 in the form of an expandable snap ring 90 as described above, where the snap ring 90 is installed by sliding it over the upper end 52 of bearing 50 in the direction shown by arrow 144 and over upper flange 58 to ring groove 59, as shown in FIG. 10E. Snap ring 90 is elastically deformed over these features until it reaches ring groove 59 whereupon the elastically deformed snap ring 59 releases its elastic energy thereby snapping into ring groove 59 to capture bearing 50 within housing 70 as shown in FIG. 10F.

A dust boot 110 as described herein may optionally be installed onto and become a part of ball joint assembly 28, as also shown in FIG. 10F. Dust boot 110 is assembled by sliding housing end 112 over the stud portion 32 in the direction shown by arrow 146 until it seats onto the exterior surface 80 of housing 70. If a clamp groove 86 is employed, the dust boot will preferably incorporate upper protrusion 116, and will be inserted in the manner described until upper protrusion 116 seats into clamp groove 86. At the same time, collar 118 engages and is seated onto stud portion 32, such as by collar protrusion 119 engaging a collar groove 33 which has been formed onto stud portion 32. Once dust boot 110 is seated in the manner described, retainers 120 and 130, such as spring clamp 120 and retaining ring 130 may be installed to fix the dust boot 110 to housing 70 and stud portion 32. The retainers may be permanent or removable depending on the requirements of ball joint assembly 28.

Figure 16:
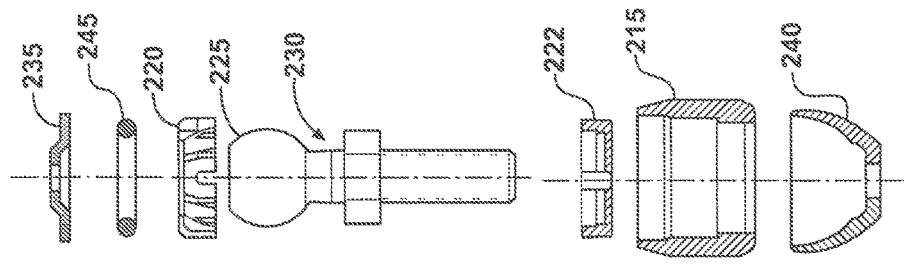
FIG. 16 is an exploded partial cross-sectional view of the ball joint assembly of FIG. 15.
Figure 15:
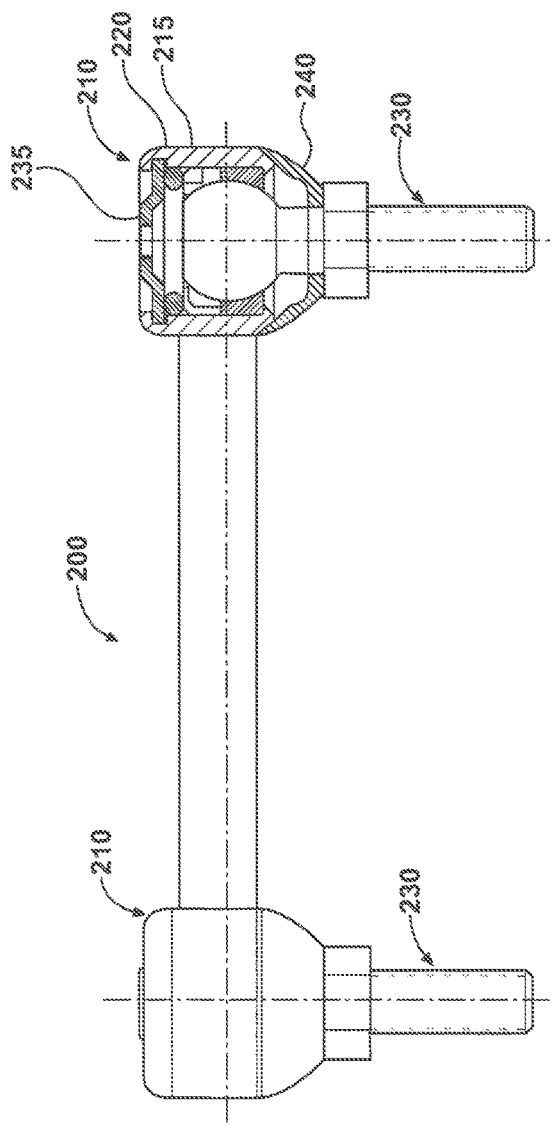
FIG. 15 depicts typical prior art ball joint assemblies as used in the application of a stabilizer linkage.

The subject ball joint assembly 28 is distinguished from prior art ball joint assemblies through its use of a socket or bearing 50 which does not require a separate closure cover plate opposite the stud 30. Further retainer 90 positively resists distortion or expansion of the upper end of the bearing socket 50 if the ball stud 30 is pulled away from the housing 70. It also positively resists push through of the bearing socket 50 in the direction from which it was installed through the action of lower flange 60 if a push-in force is applied to ball stud 28 and bearing 50 relative to housing 70. The ball joint assembly of the invention also uses fewer parts, six versus eight, than prior art ball joint assemblies, as shown in FIGS. 15 and 16.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method of making a ball joint assembly, comprising the steps of:
    forming a ball stud having an attachment stud at one end and a ball portion at an opposing end;
    forming a housing having an upper end, a lower end and a cylindrical bore extending therebetween and defining a sidewall of the housing and a counterbore proximate the lower end forming a bearing shoulder within the sidewall;
    forming a cylindrical bearing having an upper end, a lower end, a cylindrical exterior sidewall, an upper flange located between the upper end and a ring groove formed in the exterior sidewall, a lower flange proximate the lower end and extending outwardly from the exterior sidewall and a socket cavity that opens toward the lower end;
    inserting the ball portion of the ball stud into the socket cavity of the bearing;
    inserting the upper end of the bearing into the bore at the lower end of the housing so as to seat the lower flange of the bearing against the bearing shoulder of the counterbore and expose the upper end of the bearing and the ring groove; and
    installing a retainer over the top flange sufficiently to achieve locking engagement with the ring groove.

2. The method of claim 1, further comprising a step of attaching a cylindrical elastomeric boot having a housing end and a stud end to said ball joint assembly, the housing end partially enclosing the housing and the stud end partially enclosing the attachment stud.

3. The method of claim 1, wherein said step of forming the bearing comprises forming a relieved portion in the upper end thereof.

4. The method of claim 3, wherein said step of forming the bearing comprises forming at least one of a strut or a rib in said relieved portion.

5. The method of claim 1, wherein said step of forming the bearing comprises forming a socket cavity opening to the lower end of the bearing with a tapered lead-in to the socket cavity defining a cavity opening, wherein a size of the cavity opening is selected to resist a pull-out load of at least 650 lbs.

6. The method of claim 1, wherein said step of forming the bearing comprises forming at least one longitudinally extending slot in the sidewall of the bearing.

7. The method of claim 6, wherein said step of forming the bearing comprises forming a plurality of longitudinally extending, radially spaced slots in the sidewall of the bearing.

8. The method of claim 6, wherein said step of forming the bearing comprises forming a plurality of longitudinally extending, laterally spaced slots in the sidewall of the bearing.

* * * * *